(12) United States Patent
Goyal et al.

(10) Patent No.: US 10,599,915 B2
(45) Date of Patent: Mar. 24, 2020

(54) PROVIDING SUGGESTED CONTENT BASED ON USER DETECTED GESTURE

(71) Applicant: INTERNATIONAL BUSINESS MACHINES CORPORATION, Armonk, NY (US)

(72) Inventors: Munish Goyal, Yorktown Heights, NY (US); Wing L. Leung, Austin, TX (US); Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 15/409,846

(22) Filed: Jan. 19, 2017

(65) Prior Publication Data
US 2018/0203947 A1    Jul. 19, 2018

(51) Int. Cl.
| | |
|---|---|
| G06T 7/70 | (2017.01) |
| G06K 9/00 | (2006.01) |
| G06F 3/00 | (2006.01) |
| G06F 3/01 | (2006.01) |
| G06F 3/0346 | (2013.01) |
| G06F 3/0354 | (2013.01) |
| G06F 3/0488 | (2013.01) |
| G06F 16/9535 | (2019.01) |
| G06F 9/451 | (2018.01) |

(Continued)

(52) U.S. Cl.
CPC ......... *G06K 9/00302* (2013.01); *G06F 3/017* (2013.01); *G06F 3/0304* (2013.01); *G06F 3/03545* (2013.01); *G06F 9/451* (2018.02); *G06F 9/453* (2018.02); *G06F 16/9535* (2019.01); *G06F 9/4451* (2013.01)

(58) Field of Classification Search
CPC ......... G06F 17/30991; G06F 17/30259; G06F 17/30867; G06F 3/017; G06F 3/04883; G06F 3/005; G06F 3/03545; G06F 3/0346; G06T 7/70; G06K 9/00302
See application file for complete search history.

(56) References Cited

U.S. PATENT DOCUMENTS

| | | | |
|---|---|---|---|
| 7,987,182 B2 * | 7/2011 | Slothouber | G06F 16/9535 707/722 |
| 9,122,376 B1 | 9/2015 | Brotherston et al. | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Shourjo Dasgupta
(74) *Attorney, Agent, or Firm* — James Nock; Andrew D. Wright; Roberts Mlotkowski Safran Cole & Calderon, P.C.

(57) ABSTRACT

A computer-implemented method comprises: monitoring, by a user device, user gesture and user input activity by a user of the user device; detecting, by the user device, that the user has entered a thinking state based on the monitoring; determining, by the user device, subject content based on content displayed on a display of the user device based on the detecting; determining, by the user device, relevant content associated with the subject content; and presenting, by the user device, the relevant content to the user via the display.

17 Claims, 7 Drawing Sheets

(51) Int. Cl.
   *G06F 3/03*         (2006.01)
   *G06F 9/445*        (2018.01)

(56) References Cited

U.S. PATENT DOCUMENTS

| | | | | |
|---|---|---|---|---|
| 2009/0319177 | A1* | 12/2009 | Khosravy | G06Q 30/0241 |
| | | | | 701/408 |
| 2010/0094878 | A1* | 4/2010 | Soroca | G06Q 30/02 |
| | | | | 707/748 |
| 2011/0201387 | A1 | 8/2011 | Paek et al. | |
| 2013/0254035 | A1* | 9/2013 | Ramer | G06Q 30/0267 |
| | | | | 705/14.62 |
| 2014/0280890 | A1* | 9/2014 | Yi | H04L 67/22 |
| | | | | 709/224 |
| 2014/0316849 | A1* | 10/2014 | Pasila | G06Q 30/0201 |
| | | | | 705/7.29 |
| 2015/0120712 | A1* | 4/2015 | Yi | G06F 16/4387 |
| | | | | 707/723 |
| 2015/0356622 | A1* | 12/2015 | Dhawan | G06Q 30/0269 |
| | | | | 705/14.66 |
| 2016/0012475 | A1* | 1/2016 | Liu | G06F 3/013 |
| | | | | 705/14.49 |
| 2016/0029081 | A1* | 1/2016 | Fukuchi | H04N 21/4223 |
| | | | | 725/10 |
| 2016/0110646 | A1* | 4/2016 | Somekh | G06N 5/04 |
| | | | | 706/46 |
| 2016/0171511 | A1* | 6/2016 | Goel | G06Q 50/01 |
| | | | | 705/7.29 |
| 2016/0180762 | A1* | 6/2016 | Bathiche | G06F 3/013 |
| | | | | 345/174 |
| 2016/0180798 | A1* | 6/2016 | Bathiche | G06F 3/013 |
| | | | | 345/522 |
| 2017/0068847 | A1* | 3/2017 | el Kaliouby | A61B 5/165 |

OTHER PUBLICATIONS

Mazo, "Flow to use Smart Stay on the Galaxy S3", Android Central, http://www.androidcentral.com/how-use-smart-stay-galaxy-s3, Jul. 18, 2012, 12 pages.

* cited by examiner

PROVIDING SUGGESTED CONTENT BASED ON USER DETECTED GESTURE

BACKGROUND

The present invention generally relates to providing suggested content to a user via a user device and, more particularly, to providing suggested content to the user based on a detected user gesture.

User devices, such as laptops, tablets, smartphones, etc., include touch screen interfaces via which a user may provide user input. Users often use accessory devices, such as a stylus to hand write or hand draw on a touch screen in order digitally capture handwriting or drawings. The ability to digitally hand write text via a touch screen of a user device provides a level of convenience for users who prefer to hand write rather than type using a physical or virtual keyboard. When writing (e.g., an article, story, etc.), a user may momentarily pause while thinking of subsequent material to write.

SUMMARY

In an aspect of the invention, a computer-implemented method includes: monitoring, by a user device, user gesture and user input activity by a user of the user device; detecting, by the user device, that the user has entered a thinking state based on the monitoring; determining, by the user device, subject content based on content displayed on a display of the user device based on the detecting; determining, by the user device, relevant content associated with the subject content; and presenting, by the user device, the relevant content to the user via the display.

In an aspect of the invention there is a computer program product for detecting that the user has entered a thinking state while using a user device and providing relevant content, the computer program product comprising a computer readable storage medium having program instructions embodied therewith, the program instructions executable by a computing device to cause the computing device to: monitor user input activity by the user of the user device; detect that the user has entered a thinking state based on a pause in the user input activity; determine subject content based on content displayed on a display of the user device based on the detecting; determine relevant content associated with the subject content; and present the relevant content to the user via the display.

In an aspect of the invention a system comprises: a CPU, a computer readable memory and a computer readable storage medium associated with a user device; program instructions to monitor user input to the user device via an accessory device; program instructions to detect a pause in the user input based on the monitoring; program instructions to provide relevant content to the user via the user device based on the detecting the pause. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to providing suggested content to a user via a user device and, more particularly, to providing suggested content to the user based on a detected user gesture. Aspects of the present invention may detect a user gesture (e.g., a "thinking" gesture) when the user pauses from digitally hand writing text via a touch screen of a user device. Based on the detecting, the user device may identify the content currently viewed on the screen of the user device and/or content that has been written thus far by the user. Further, the user device may identify and present suggested or relevant content based on the viewed content, the currently written content, and/or user knowledge, interest, and expertise data. In this way, relevant content is presented to the user while the user is thinking in order to assist the user in enhancing the user's thoughts and gain insights into additional material to assist with completing the user's thoughts and writing. Further, relevant content is presented based on a prediction of what the user may be thinking as determined by the content currently being viewed when the user has entered a "thinking" state.

As described herein, the user device may include a cognitive assistance component to monitor the user's gestures, writing activity, etc., and to detect that user has paused writing activity and has entered a "thinking" state. For example, the cognitive assistance component may detect, using a camera on the user device and based on visual analysis of the user's facial expressions, pen/stylus position, user input/writing activity, etc., that the user has entered a thinking state. As a specific, non-limiting and illustrative example, the cognitive assistance component may use facial recognition techniques to identify a facial expression consistent with a thinking gesture. Additionally, or alternatively, the cognitive assistance component may use image analysis techniques (e.g., pixel-based analysis, object detection, etc.) to detect the presence of an accessory device (e.g., a stylus) in front of the user's face, and a position of the stylus to determine that the presence and/or position of the stylus is consistent with a thinking gesture. As a specific, non-limiting and illustrative example, the cognitive assistance component may determine that the user is holding a stylus to their mouth, or is holding the stylus between their earlobe and head in a manner that is consistent with a thinking gesture. In alternative embodiments, the cognitive assistance component may receive information from sensors implemented within a stylus to determine the position/orientation of the stylus and to determine that the position/orientation of the stylus is consistent with a thinking gesture.

As further described herein, the cognitive assistance component may identify a specific section on the display of the user device on which the user is focused, and may identify relevant content based on the content displayed on the user-focused section. Additionally, or alternatively, the cognitive assistance component may identify relevant content further based on a user profile identifying the user's interests, historical written content, writing styles, etc. The cognitive assistance component may present the relevant content on the user device and the user may select to insert some or all of the relevant content (e.g., to a notepad or other application) using touch input, input via a stylus, or a combination thereof.

As described herein, the cognitive assistance component may determine that user has entered a thinking state and determine the relevant content to the user based on a user profile stored in a computer-accessible database and by accessing billions of webpages and/or other computer-readable documents via a computer network. It is therefore emphasized that the processes of the present invention cannot practically performed by human, and that the present invention provides a technical solution to the technical problem of obtaining relevant content that is only accessible through computer-related technology and computer searching techniques.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
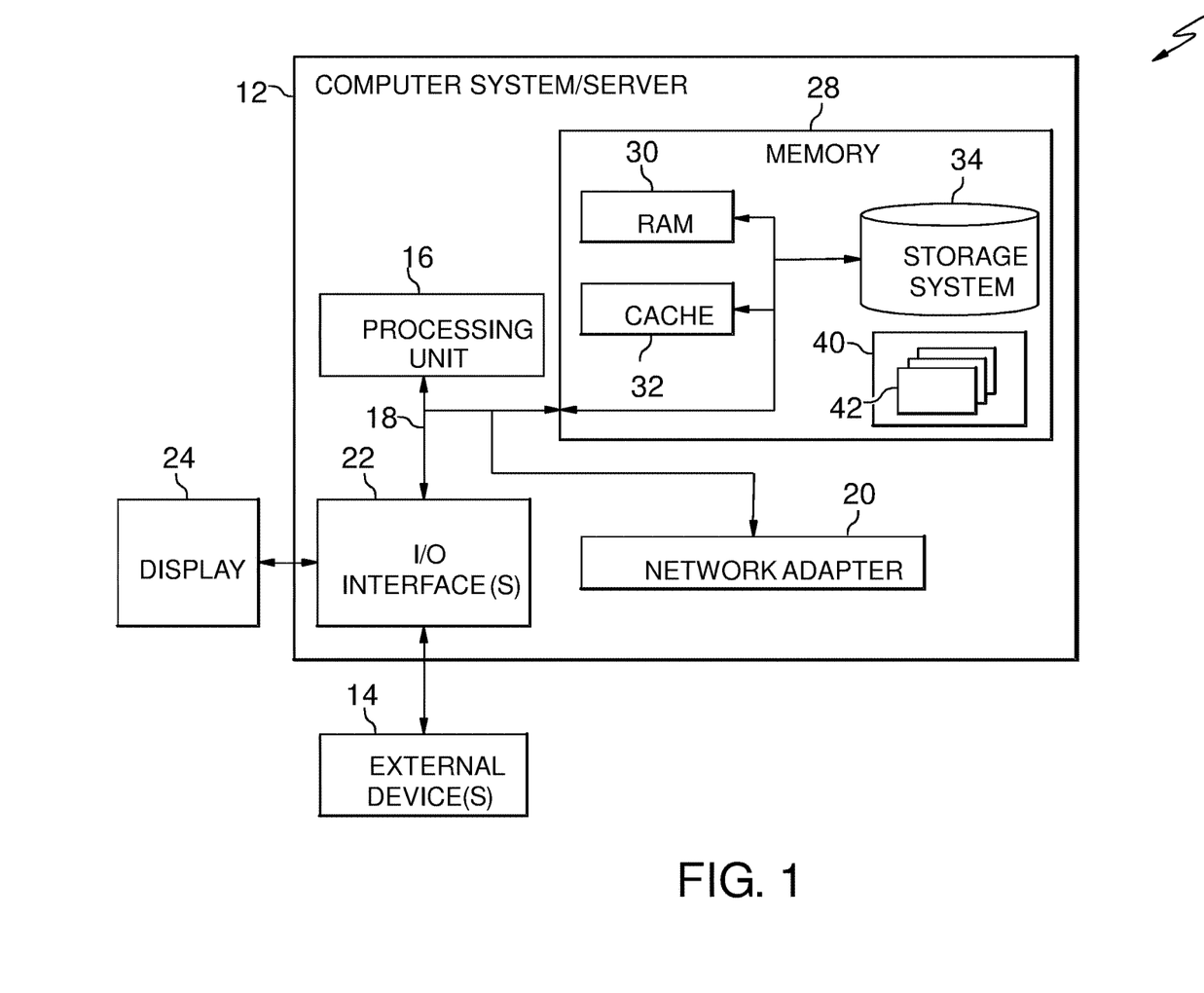
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
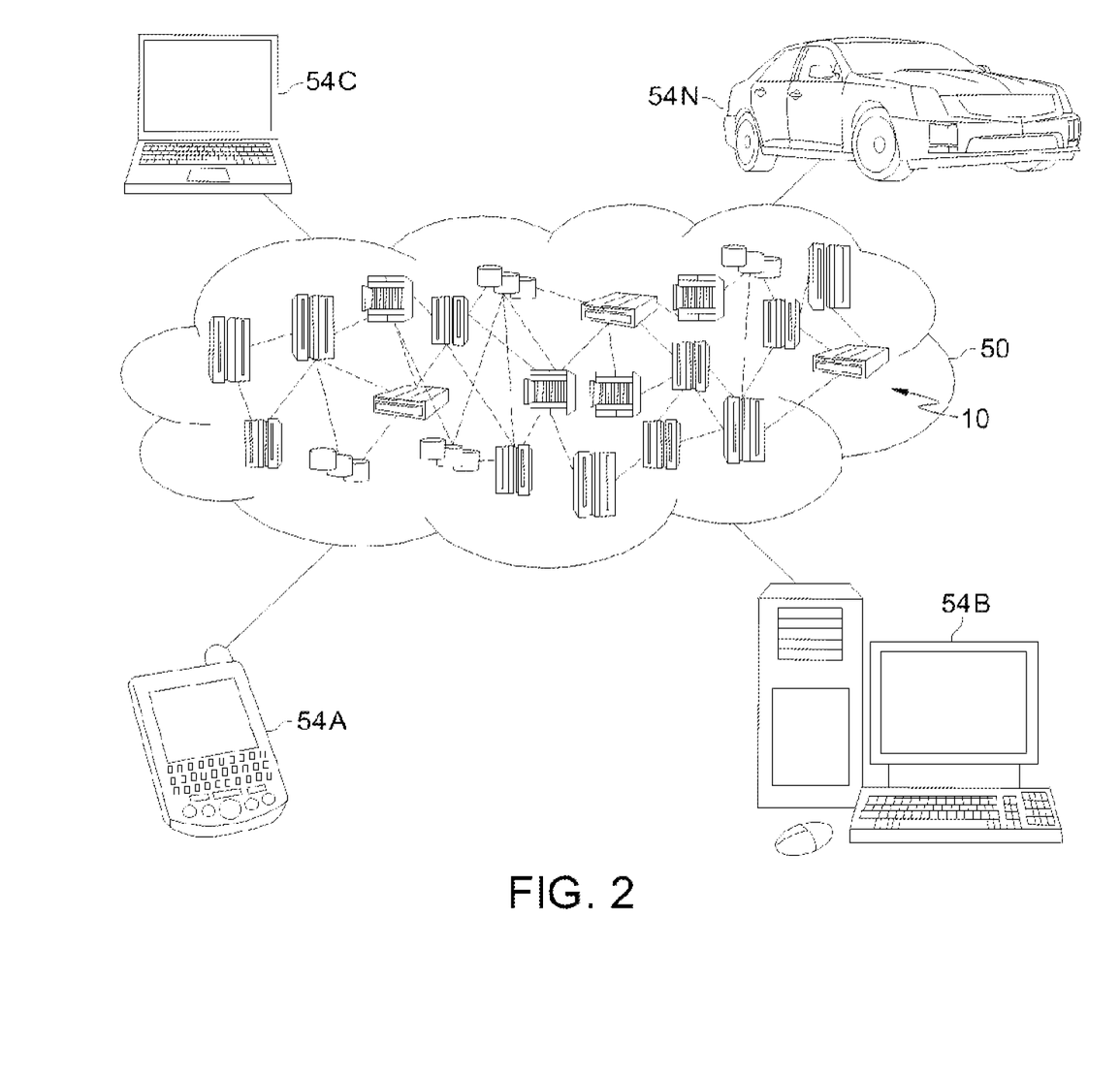
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
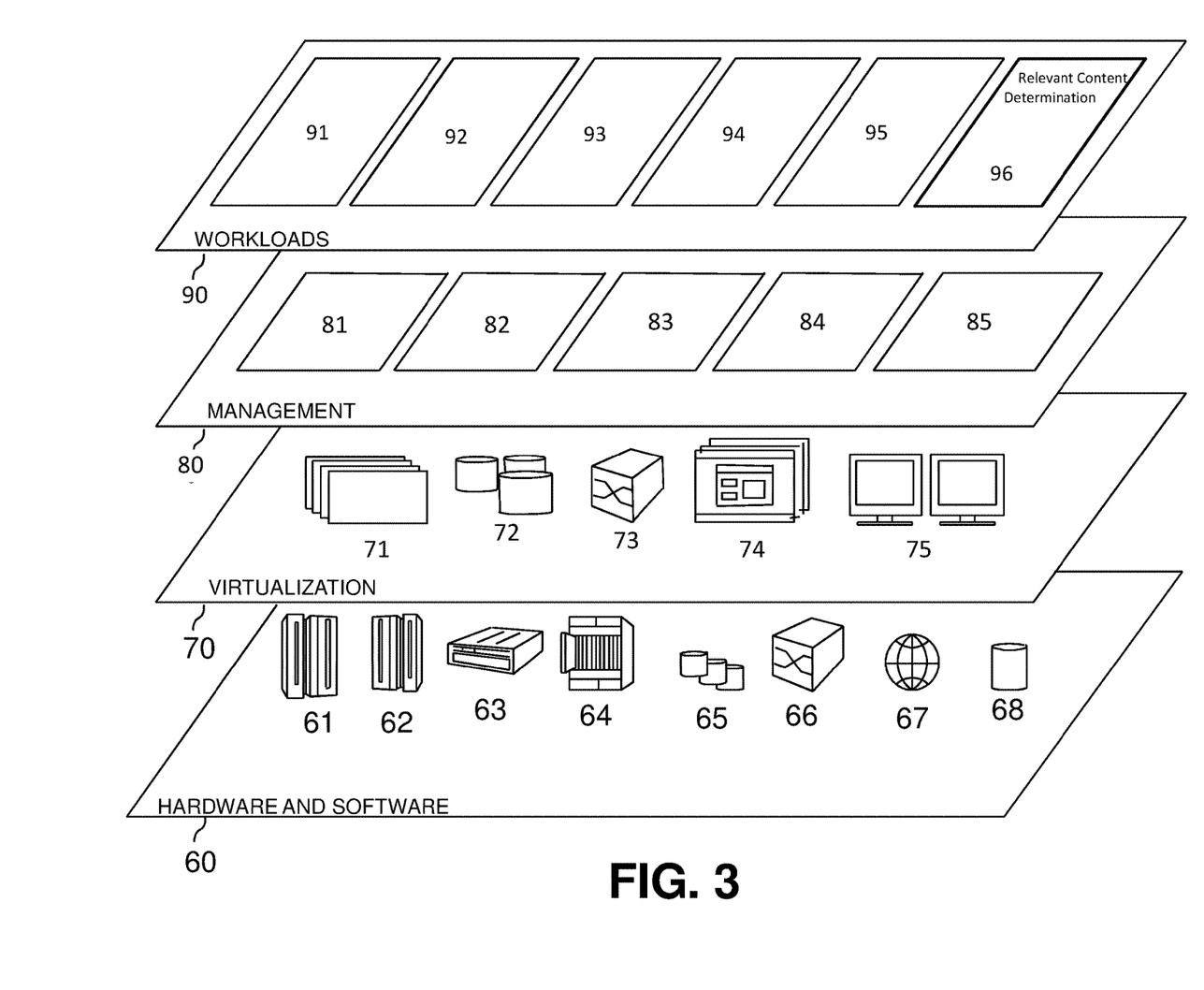
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relevant content determination 96.

Referring back to FIG. 1, the program/utility 40 may include one or more program modules 42 that generally carry out the functions and/or methodologies of embodiments of the invention as described herein (e.g., such as the functionality provided by relevant content determination 96). Specifically, the program modules 42 may monitor user gesture, detect a thinking gesture, detect content being viewed by the user on a user device, determine content related to the viewed content based on a user profile, and present the related content to the user. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cognitive assistance component 215 as shown in FIG. 4.

Figure 4:
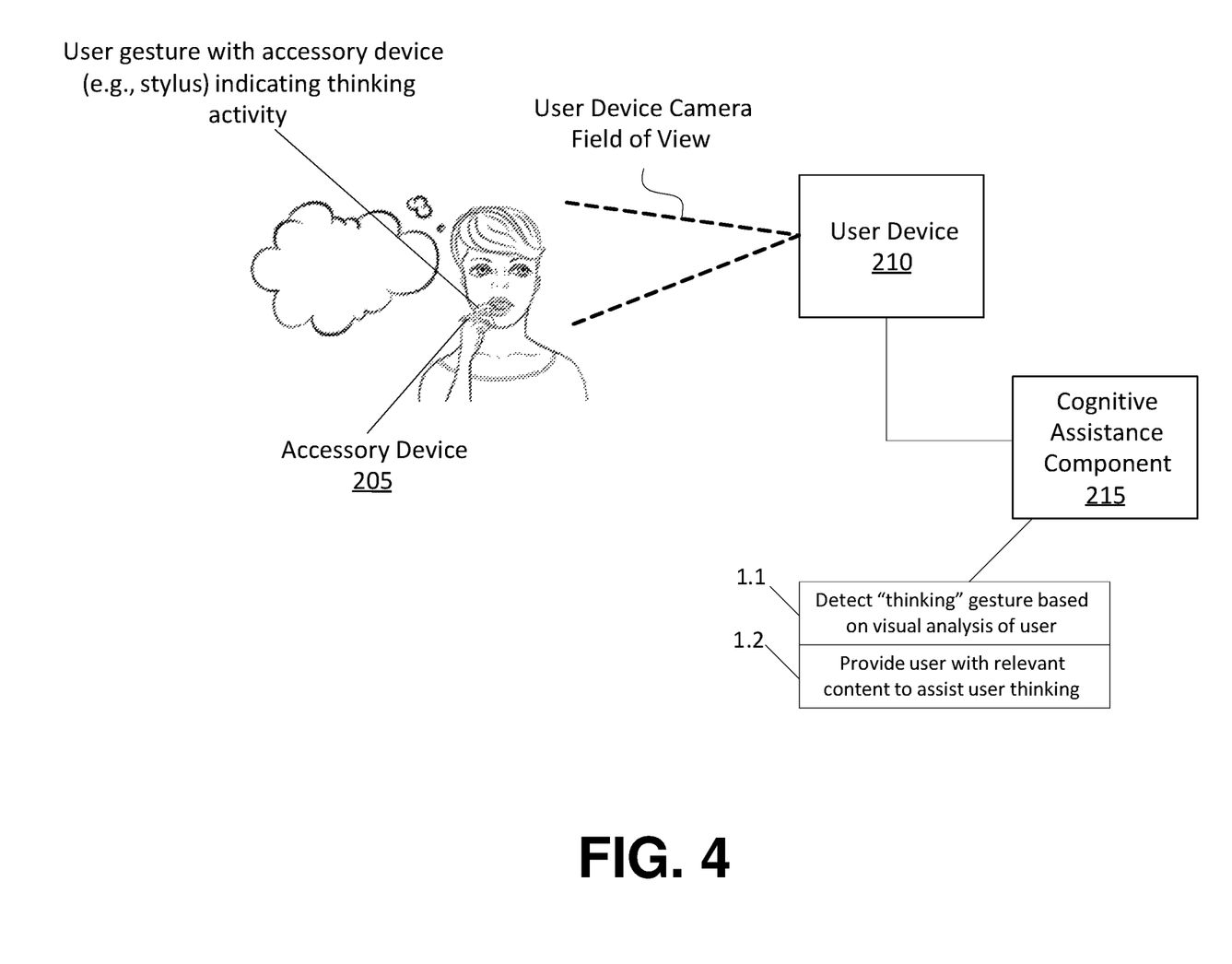
FIG. 4 shows an overview of an example implementation in accordance with aspects of the present invention.

FIG. 4 shows an overview of an example implementation in accordance with aspects of the present invention. As shown in FIG. 4, a user device 210 may observe a user via a camera while the user is within a field of view of the camera. For example, while the user device 210 is set on a surface and the user is writing on the display of the user device 210, the camera device may be used to observe the user. At step 1.1, a cognitive assistance component 215 implemented by the user device 210 may detect, based on observing the user and a visual analysis of the user, a "thinking" gesture. For example, the cognitive assistance component 215 may detect the thinking gesture when the user pauses from writing (e.g., indicating a cognitive pause in which the user has paused from writing and is now thinking about subsequent material to write). More specifically, the cognitive assistance component 215 may detect the thinking gesture facial recognition techniques to identify a facial expression consistent with a thinking gesture. Additionally, or alternatively, the cognitive assistance component 215 may use image analysis techniques (e.g., pixel-based analysis, object detection, etc.) to detect the presence of an accessory device 205 (e.g., a stylus) in front of the user's face/mouth, and a position of the stylus to determine that the presence and/or position of the stylus is consistent with a thinking gesture. In alternative embodiments, the cognitive assistance component 205 may receive information from sensors implemented within the accessory device 205 to determine the position/orientation of the accessory device 205 and to determine that the position/orientation of the accessory device 205 is consistent with a thinking gesture.

At step 1.2, the cognitive assistance component 215 may provide the user with relevant content to assist to the user's thinking. For example, the cognitive assistance component 215 may provide content that is of a similar subject to that of which the user is writing, or that is of a similar subject to content displayed on the user device 210. In embodiments, the cognitive assistance component 215 may search for the relevant content on webpages by using a search engine and/or other searching techniques. For example, the cognitive assistance component 215 may perform a word search corresponding to words written by the user, an image search correspond to objects drawn by the user or being displayed on the user device 210, etc.

As further described herein, the cognitive assistance component 215 may identify a specific section on the display of the user device 210 on which the user is focused, and may identify relevant content based on the content displayed on the user-focused section. Additionally, or alternatively, the cognitive assistance component 215 may identify relevant content further based on a user profile identifying the user's interests, knowledge, experience, historical activity (e.g., web browsing activity, writing activity, writing styles, etc.). For example, the cognitive assistance component 215 may determine that the user's knowledge/interests relate to the subject content (e.g., the content on the user device 210 on which the user is focusing), and may determine that particular areas of the user's knowledge are relevant to the subject content. As an illustrative, non-limiting example, the cognitive assistance component 215 may determine that the user profile identifies that the user has knowledge and experience in a particular skill set (e.g., software encryption), and that the subject content is related to software encryption, but that the user has not yet written anything related to software encryption. In this example, the cognitive assistance component 215 may determine that software encryption concepts are relevant to the subject content. The cognitive assistance component 215 may further search for software encryption webpages/information, previously text written by the user relating to software encryption, and/or other relevant content.

The cognitive assistance component 215 may present the relevant content on the user device and the user may select to insert some or all of the relevant content (e.g., to a notepad or other application) using touch input, input via a stylus, or a combination thereof. In this way, relevant content is presented to the user while the user is thinking in order to assist the user in enhancing the user's thoughts and gain insights into additional material to assist with completing the user's thoughts and writing.

Figure 5:
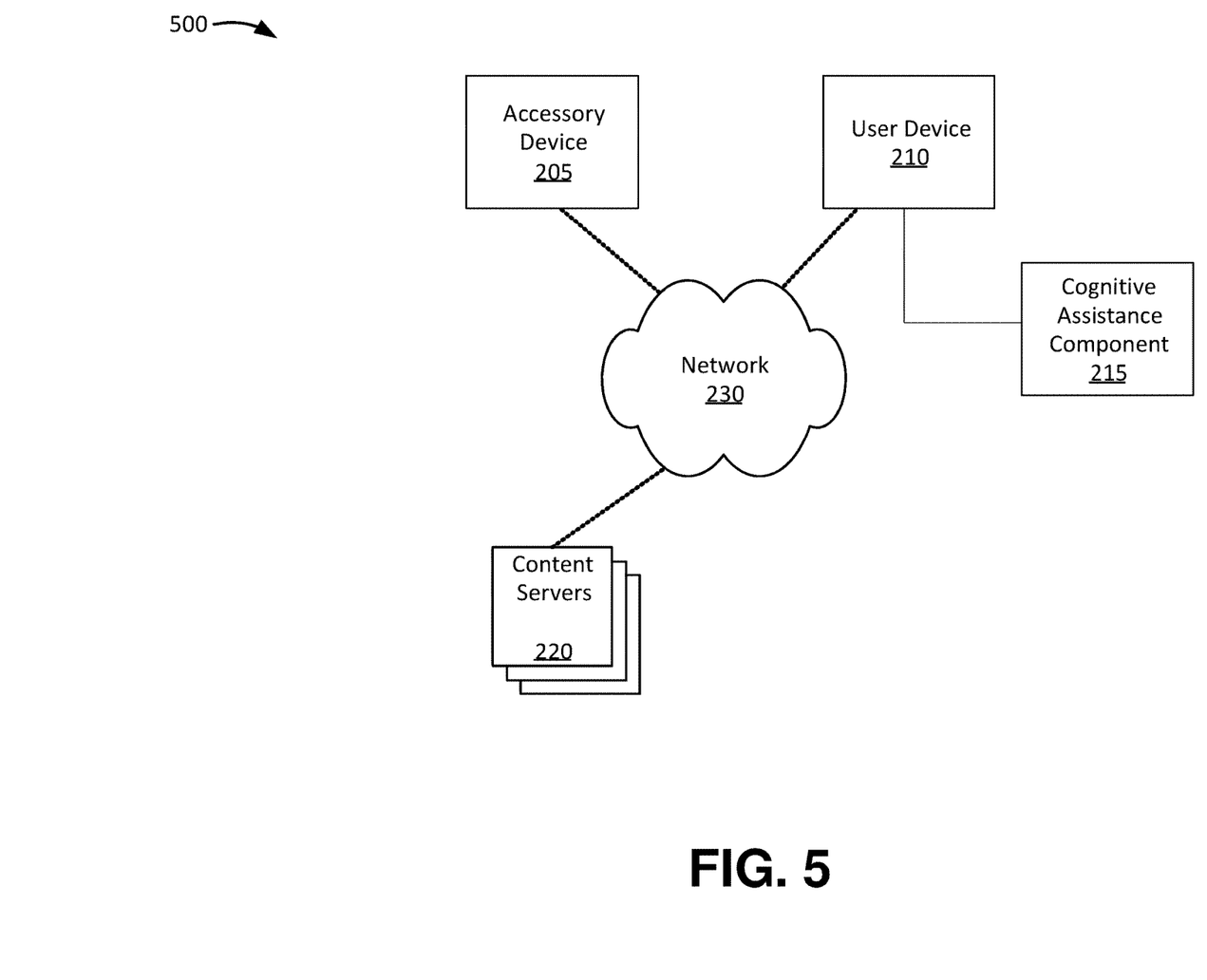
FIG. 5 shows an example environment in accordance with aspects of the present invention.

FIG. 5 shows an example environment in accordance with aspects of the present invention. As shown in FIG. 5, environment 500 may include a accessory device 205, a user device 210, content servers 220, and network 230. In embodiments, one or more components in environment 500 may correspond to one or more components in the cloud computing environment of FIG. 2. In embodiments, one or more components in environment 500 may include the components of computer system/server 12 of FIG. 1.

The accessory device 205 may include an electronic pen, stylus, or similar type of device that is capable of providing input to an interactive touch display of user device 210. The accessory device 205 may be used by a user to digitally capture handwriting, hand drawings, and/or other touch-based input. The accessory device 205 may include one or more touch sensors, motion sensors, gyroscopes, position sensors etc. that may be used to determine a position/orientation of the accessory device 205. The sensors on the accessory device 205 may be used to capture movement of the stylus which may in turn be used to control or provide input to the user device 210.

The user device 210 may include a computing device capable of communicating via a network, such as the network 230. For example, the user device 210 may correspond to a mobile communication device (e.g., a smartphone or a personal digital assistant (PDA)), a portable computer device (e.g., a laptop or a tablet computer), a desktop computing device with a corresponding touchpad, or touchscreen display, or another type of computing device. In some embodiments, the user device 210 may include one or more sensors and/or cameras that may capture a user's activity/gestures.

The user device 210 may include a cognitive assistance component 215 that monitors the user's activity/gestures from the sensors/cameras to determine when the user has entered a "thinking" state or gesture, as described herein. The cognitive assistance component 215 may also determine a user's focus area based on the sensors/cameras, obtain user profile information related to content presented on an area of a display of user device 210 mapping with the user's focus area, and present related content to the user via the user device 210 display. In this way, the cognitive assistance component 215 may predict what the user may be thinking when in a "thinking" state, and present relevant content based on the what the user may thinking and based on the user's prior knowledge, interests, etc. The cognitive assistance component 215 may perform other actions and processes as described herein. The cognitive assistance component 215 may include one or more of the components of the computer system/server 12 of FIG. 1.

The content servers 220 may include one or more computing/service devices (such as a computer system/server 12 of FIG. 1) that hosts content available to user devices 210 via network 230 (e.g., via the internet). In embodiments, the cognitive assistance component 215 may search the content servers 220 for relevant content relating to a subject about which a user may be thinking, as described herein.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
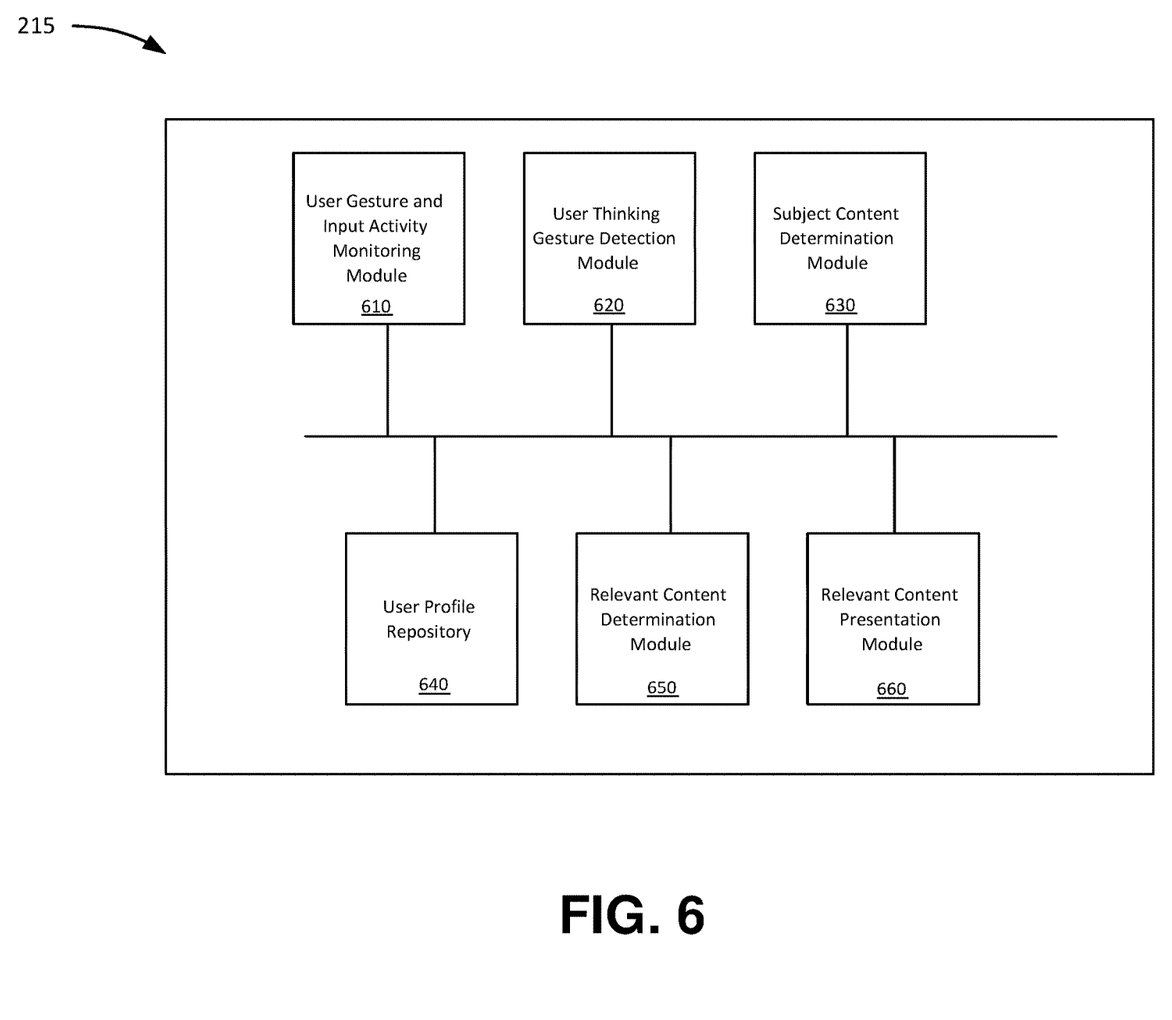
FIG. 6 shows a block diagram of example components of a cognitive assistance component in accordance with aspects of the present invention.

FIG. 6 shows a block diagram of example components of a cognitive assistance component 215 in accordance with aspects of the present invention. As shown in FIG. 6, the cognitive assistance component 215 may include a user gesture and input activity monitoring module 610, a user thinking gesture detection module 620, a subject content determination module 630, a user profile repository 640, a relevant content determination module 650, and a relevant content presentation module 660. In embodiments, the cognitive assistance component 215 may include additional or fewer components than those shown in FIG. 6. In embodiments, separate components may be integrated into a single computing component or module. Additionally, or alternatively, a single component may be implemented as multiple computing components or modules.

The user gesture and input activity monitoring module 610 may include a program module (e.g., program module 42 of FIG. 1) that monitors the gestures of a user using the user device 210. For example, the user gesture and input activity monitoring module 610 may monitor the user's gestures by obtaining information from one or more camera devices implemented by the user device 210. Additionally, or alternatively, the user gesture and input activity monitoring module 610 may monitor the user's gestures by obtaining information from one or more sensors obtained by the accessory device 205. The user gesture and input activity monitoring module 610 may also monitor user input activity on the user device 210 (e.g., monitor the user's usage of the user device 210, writing activity via the accessory device 205, typing activity, etc.).

The user thinking gesture detection module 620 may include a program module (e.g., program module 42 of FIG. 1) that detects that a user's gesture is consistent with a thinking gesture when the user has entered a "thinking" state. For example, the user thinking gesture detection module 620 may detect that the user's gesture is a thinking gesture based on visual analysis of the user's facial expressions when monitoring the user's gestures via a camera of the user device 210 as described above with respect to the user gesture and input activity monitoring module 610. Additionally, or alternatively, the user thinking gesture detection module 620 may detect that the user's gesture is a thinking gesture based on the information obtained from one or more sensors obtained by the accessory device 205. For example, the user thinking gesture detection module 620 may detect the thinking gesture based on senor data indicating that the accessory device 205 is positioned or oriented in a manner consistent with the thinking gesture. Additionally, or alternatively, the user thinking gesture detection module 620 may detect the thinking gesture based on detecting that the proximity of the accessory device 205 is consistent with that of the thinking gesture (e.g., when the accessory device 205 is located at the user's mouth, ear lobe area, etc.). Additionally, or alternatively, the user thinking gesture detection module 620 may detect the thinking gesture based on detecting a pause in writing activity and/or other user activity for a threshold period of time.

The subject content determination module 630 may include a program module (e.g., program module 42 of FIG.

1) that determines subject content for which suggested or related content will be determined. In embodiments, the subject content determination module 630 may determine the subject content as content being viewed by the user based on a direction and viewing angle at which the user's eyes are focused on the display of the user device 210. In embodiments, the subject content determination module 630 may detect the viewing angle using image analysis techniques on video data captured by the camera of user device 210. For example, the subject content determination module 630 may identify the user's eyes from the camera and an angle in which the eyes are facing relative to the display of the user device 210 to determine a user-focused section on the display of the user device 210 and the content presented on the user-focused section. In a situation in which a user-focused section is unable to be determined, the subject content determination module 630 may assume that the content on the entire display is being viewed and that the content on the entire display is the subject content. In embodiments, the subject content determination module 630 may also determine subject content as written words and/or other handwritten user input from the accessory device 205.

The user profile repository 640 may include a data storage device (e.g., storage system 34 of FIG. 1) that stores information regarding the user, such as user interests, knowledge, historical writing styles, historical written content, web browsing activity, etc. As described herein, information stored by the user profile repository 640 may be used to identify relevant or suggested content that is related to the user profile information and the subject content from the subject content determination module 630.

The relevant content determination module 650 may include a program module (e.g., program module 42 of FIG. 1) that may identify relevant content based on the user profile information in the user profile repository 640 and the subject content determined by the subject content determination module 630. For example, the relevant content determination module 650 may determine that particular areas of the user's knowledge are relevant to the subject content. As an illustrative, non-limiting example, the relevant content determination module 650 may determine that the user profile identifies that the user has knowledge and experience in a particular skill set (e.g., software encryption), and that the subject content is related to software encryption, but that the user has not yet written anything related to software encryption. In this example, the relevant content determination module 650 may determine that software encryption concepts are relevant to the subject content. The relevant content determination module 650 may further search for software encryption webpages/information, previously text written by the user relating to software encryption, and/or other relevant content.

In embodiments, the relevant content determination module 650 may further determine relevant content based on the knowledge and/or experiences of other users having prior experience with the subject content. For example, the relevant content determination module 650 may identify a subject matter expert (SME) having prior experience with the subject content by searching a database that identifies SME's associated with the subject content. The relevant content determination module 650 may obtain relevant content previously authored by the SME (e.g., articles, books, blog post, social media posts, and/or other publications authored by the SME on the subject content, or based on user profile data or social media profile of the SME). Additionally, or alternatively, relevant content determination module 650 may identify users having prior experience with the subject content from a social media network, and may obtain relevant content previously authored by those identified users. For example, the relevant content determination module 650 may search a social media network with words/phrases relating to the subject content as a search query to identify individuals on a social media network having expertise in the subject content.

The relevant content presentation module 660 may include a program module (e.g., program module 42 of FIG. 1) that may present the relevant content on the user device 210. In embodiments, the relevant content presentation module 660 may present the relevant content in a section of the display of the user device 210 corresponding to a user-focused section. The relevant content presentation module 660 may receive user input (e.g., via the touch screen and/or gestures/movements made with the accessory device 205) to insert some or all of the relevant content (e.g., to a notepad application in which the user is currently writing) or hide the relevant content.

Figure 7:
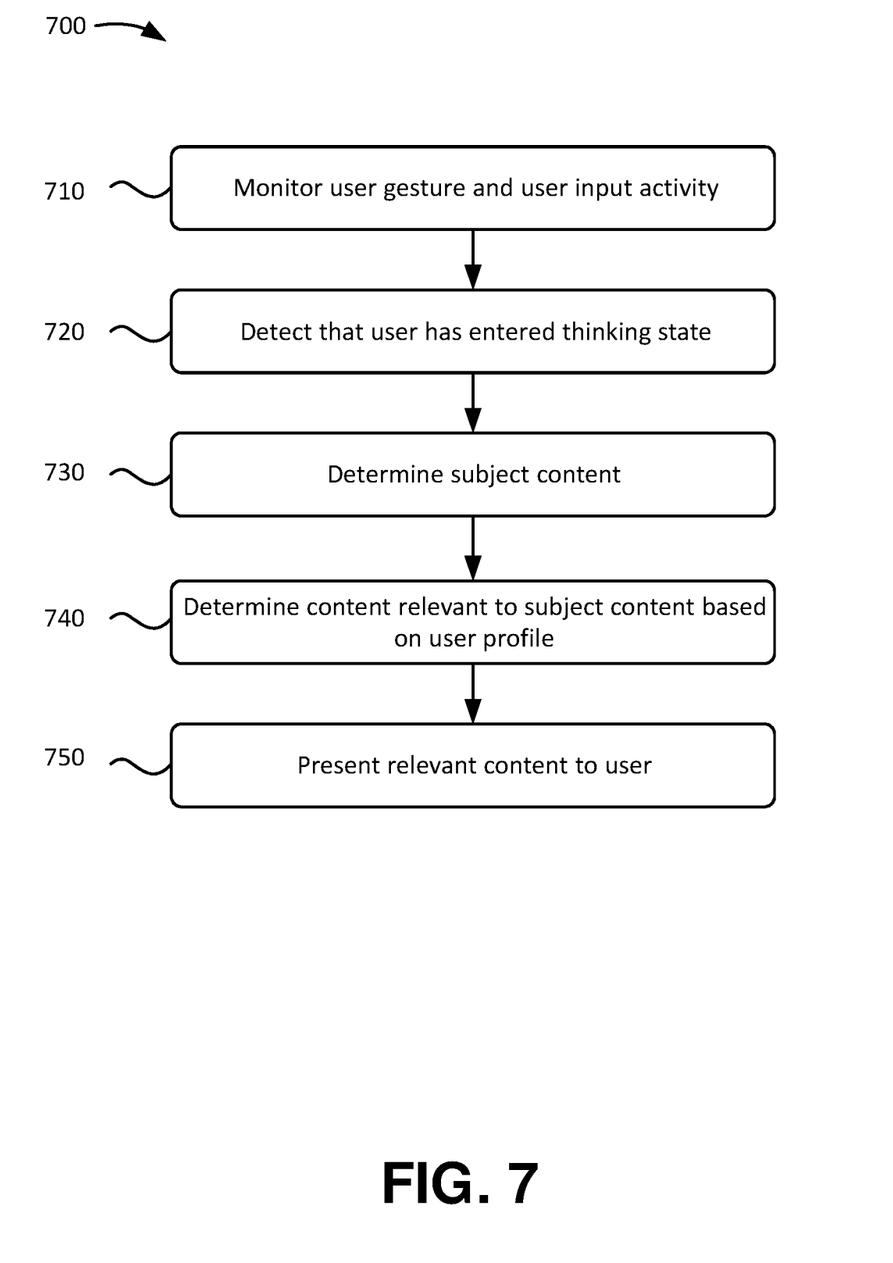
FIG. 7 shows an example flowchart for determining and presenting relevant content to a user based on detecting that the user has entered a thinking state in accordance with aspects of the present invention.

FIG. 7 shows an example flowchart of a process 700 for determining and presenting relevant content to a user based on detecting that the user has entered a thinking state. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include monitoring a user's gestures and user input activity (step 710). For example, as described above with respect to the user gesture and input activity monitoring module 610, the cognitive assistance component 215 may monitor the user's gestures while the user is using the user device 210 by obtaining information from one or more camera devices implemented by the user device 210. Additionally, or alternatively, the cognitive assistance component 215 may monitor the user's gestures by obtaining information from one or more sensors obtained by the accessory device 205. The cognitive assistance component 215 may also monitor user input activity on the user device 210 (e.g., monitor the user's usage of the user device 210, writing activity via the accessory device 205, typing activity, etc.).

Process 700 may also include detecting that the user has entered a thinking state (step 720). For example, as described above with respect to the user thinking gesture detection module 620, the cognitive assistance component 215 may detect that a the user has entered a thinking state when the user's gesture is consistent with a thinking gesture based on visual analysis of the user's facial expressions. Additionally, or alternatively, the cognitive assistance component 215 may detect that the user's gesture is a thinking gesture based on the information obtained from one or more sensors obtained by the accessory device 205. For example, the user thinking gesture detection module 620 may detect the thinking gesture based on senor data indicating that the accessory device 205 is positioned or oriented in a manner consistent with the thinking gesture. Additionally, or alternatively, the user thinking gesture detection module 620 may detect that the user has entered the thinking state based on detecting a pause in writing activity and/or other user activity for a threshold period of time. Additionally, or alternatively, the user thinking gesture detection module 620 may detect the thinking gesture based on detecting that the proximity of the accessory device 205 is consistent with that of the thinking gesture (e.g., when the accessory device 205 is located at the user's mouth, ear lobe area, etc.). In embodiments, the cognitive assistance component 215 may detect that the user has entered the thinking state even when a accessory device 205 is not being used for user input.

Process 700 may further include determining subject content (step 730). For example, as described above with respect to the subject content determination module 630, the cognitive assistance component 215 may determine subject content for which suggested or related content will be determined. In embodiments, the cognitive assistance component 215 may determine the subject content as content being viewed by the user based on a direction and viewing angle at which the user's eyes are focused on the display of the user device 210. Alternatively, the cognitive assistance component 215 may determine that the content on the entire display is the subject content. In embodiments, the cognitive assistance component 215 may also determine subject content as written words and/or other handwritten user input from the accessory device 205

Process 700 may also include determining content relevant to the subject content based on a user profile (step 740). For example, as described above with respect to the user profile repository 640 and the relevant content determination module 650, the cognitive assistance component 215 may identify relevant content based on the user profile information stored by the user profile repository 640 and the subject content determined by the subject content determination module 630. For example, the cognitive assistance component 215 may determine that particular areas of the user's knowledge are relevant to the subject content. The cognitive assistance component 215 may further search for webpages containing relevant content associated with the subject content and the user profile information. Additionally, or alternatively, the cognitive assistance component 215 may determine related content as previously text written by the user relating to the subject content.

Process 700 may further include presenting the relevant content to the user (step 750). For example, as described above with respect to the relevant content presentation module 660, the cognitive assistance component 215 may present the relevant content to the user via the user device 210. In embodiments, the cognitive assistance component 215 may present the relevant content in a section of the display of the user device 210 corresponding to a user-focused section. Alternatively, the cognitive assistance component 215 may present the relevant content in a different section of the user device 210. The cognitive assistance component 215 may receive user input (e.g., via the touch screen and/or gestures/movements made with the accessory device 205) to insert some or all of the relevant content (e.g., to a notepad application in which the user is currently writing) or hide the relevant content.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by a user device, user gesture and user input activity by a user of the user device;
    detecting, by the user device, that the user has entered a thinking state based on the monitoring;
    determining, by the user device, subject content based on content displayed on a display of the user device based on the detecting;
    determining, by the user device, relevant content associated with the subject content; and
    presenting, by the user device, the relevant content to the user via the display,
    wherein the monitoring comprises receiving data from an accessory device relating to a position and orientation of the accessory device,
    the accessory device is a stylus device, and
    the position and orientation of the accessory device is in a mouth of the user.

2. The method of claim 1, wherein the monitoring comprises receiving video data from a camera implemented by the user device.

3. The method of claim 1, wherein the detecting comprises detecting that the user activity has paused for a threshold period of time.

4. The method of claim 1, wherein the determining the relevant content is further based on at least one selected from a group consisting of:
    user profile information; and
    content previously authored by an individual having prior experience with the subject content wherein the individual having the prior experience is identified from at least one selected from a group consisting of:
    a social media network; and
    a database identifying subject matter experts having the prior experience.

5. The method of claim 4, wherein the user profile information comprises at least one selected from the group consisting of:
    user interests;
    user expertise information;
    user writing style;
    historical user written content; and
    historical user browsing activity.

6. The method of claim 1, wherein the subject content includes content being viewed by the user.

7. The method of claim 6, further comprising determining a user viewing direction, wherein the content being viewed by the user is determined based on the user viewing direction.

8. The method of claim 1, wherein a service provider at least one of creates, maintains, deploys and supports the user device.

9. The method of claim 1, wherein the monitoring, the detecting, the determining the subject content, the determining the relevant content, and the presenting the relevant content are provided by a service provider on a subscription, advertising, and/or fee basis.

10. The method of claim 1, wherein the user device includes software provided as a service in a cloud environment.

11. The method of claim 1, further comprising deploying a system for detecting that the user has entered the thinking state and providing the relevant content based on the detecting that the user has entered the thinking state, comprising providing a computer infrastructure operable to perform the monitoring, the detecting, the determining the subject content, the determining the relevant content, and the presenting the relevant content.

12. A computer program product for detecting that the user has entered a thinking state while using a user device and providing relevant content, the computer program product comprising a computer readable storage medium having program instructions embodied therewith, the program instructions executable by a computing device to cause the computing device to:
   monitor user input activity by the user of the user device;
   detect that the user has entered a thinking state based on the monitoring;
   determine subject content based on content displayed on a display of the user device based on the detecting;
   determine relevant content associated with the subject content; and
   present the relevant content to the user via the display,
   wherein the monitoring comprises receiving data from an accessory device relating to a position and orientation of the accessory device,
   the accessory device is a stylus device, and
   the position and orientation of the accessory device is in a mouth of the user.

13. The computer program product of claim 12, wherein the monitoring comprises receiving video data from a camera implemented by the user device.

14. The computer program product of claim 12, wherein the user input activity comprises receiving handwritten input to the user device via a stylus device.

15. The computer program product of claim 12, wherein the determining the relevant content is further based on user profile information.

16. A system comprising:
   a CPU, a computer readable memory and a computer readable storage medium associated with a user device;
   program instructions to monitor user input to the user device via an accessory device;
   program instructions to detect a pause in the user input based on the monitoring;
   program instructions to provide relevant content to the user via the user device based on the detecting the pause,
   wherein the monitoring comprises receiving data from the accessory device relating to a position and orientation of the accessory device,
   the accessory device is a stylus device,
   the position and orientation of the accessory device is in a mouth of the user, and
   the program instructions are stored on the computer readable storage medium for execution by the CPU via the computer readable memory.

17. The system of claim 16, further comprising program instruction to determine the relevant content based on:
   the user's viewing direction and content presented on a display of the user device corresponding to the user's viewing direction; and
   user profile information.

* * * * *